(12) United States Patent
Yonezu et al.

(10) Patent No.: US 11,654,745 B2
(45) Date of Patent: May 23, 2023

(54) AIR CONDITIONING UNIT FOR VEHICLE

(71) Applicant: DENSO CORPORATION, Kariya (JP)

(72) Inventors: Yasue Yonezu, Kariya (JP); Ryo Kobayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 114 days.

(21) Appl. No.: 17/397,626

(22) Filed: Aug. 9, 2021

(65) Prior Publication Data

US 2021/0362559 A1 Nov. 25, 2021

Related U.S. Application Data

(63) Continuation of application No. PCT/JP2020/003446, filed on Jan. 30, 2020.

(30) Foreign Application Priority Data

Feb. 20, 2019 (JP) .............................. JP2019-028527

(51) Int. Cl.
*B60H 1/00* (2006.01)

(52) U.S. Cl.
CPC ................................ *B60H 1/00464* (2013.01)

(58) Field of Classification Search
CPC ............ B60H 1/00464; B60H 1/00021; B60H 1/00471; B60H 2001/00085
See application file for complete search history.

(56) References Cited

U.S. PATENT DOCUMENTS

| 2009/0025904 A1 | 1/2009 | Tokunaga et al. |
| 2016/0379854 A1 | 12/2016 | Vopat et al. |
| 2017/0183427 A1 | 6/2017 | Kuehl et al. |
| 2018/0105013 A1 | 4/2018 | Sakakibara et al. |

FOREIGN PATENT DOCUMENTS

| DE | 102010005944 A1 * | 9/2011 | ......... B60H 1/00457 |
| DE | 112016001898 T5 * | 1/2018 | ......... B60H 1/00028 |
| FR | 2412976 A1 | 7/1979 | |
| JP | 2005088672 A * | 4/2005 | |
| JP | 2005198444 A * | 7/2005 | |
| JP | 2009023592 A | 2/2009 | |
| JP | 2009040254 A * | 2/2009 | |
| JP | 4273576 B2 * | 6/2009 | |
| JP | 2017514007 A | 6/2017 | |
| JP | 2018523305 A | 8/2018 | |
| WO | WO-2013092445 A1 * | 6/2013 | ........... F04D 19/002 |

\* cited by examiner

*Primary Examiner* — Emmanuel E Duke
(74) *Attorney, Agent, or Firm* — Harness, Dickey & Pierce, P.L.C.

(57) ABSTRACT

An air conditioning unit for a vehicle includes: an air conditioning case defining an in-case passage in which air flows to a vehicle interior; a cooler arranged in the air conditioning case and configured to cool the air flowing in the in-case passage; a blower that includes a blower motor and an impeller configured to be rotated by the blower motor and generate an air flow in the in-case passage; and a cooling passage portion defining a motor cooling passage in which air flows to cool the blower motor. The blower is arranged downstream of the cooler with respect to the air flow in the air conditioning case. The motor cooling passage includes a passage inlet located downstream of the impeller with respect to the air flow in the in-case passage, and a passage outlet located upstream of the impeller with respect to the air flow in the in-case passage.

8 Claims, 12 Drawing Sheets

AIR CONDITIONING UNIT FOR VEHICLE

CROSS REFERENCE TO RELATED APPLICATION

The present application is a continuation application of International Patent Application No. PCT/JP2020/003446 filed on Jan. 30, 2020, which designated the U.S. and claims the benefit of priority from Japanese Patent Application No. 2019-028527 filed on Feb. 20, 2019. The entire disclosures of all of the above applications are incorporated herein by reference.

TECHNICAL FIELD

The present disclosure relates to an air conditioning unit for a vehicle.

BACKGROUND

In an indoor air conditioning unit, a blower is located downstream of an evaporator with respect to an air flow. The blower includes a blower motor which is an electric motor and a fan which is an impeller rotated by the blower motor to generate the air flow.

SUMMARY

An air conditioning unit for a vehicle in one exemplar according to the present disclosure includes: an air conditioning case defining an in-case passage in which air flows to a vehicle interior; a cooler arranged in the air conditioning case and configured to cool the air that flows in the in-case passage; a blower that includes a blower motor and an impeller rotated by the blower motor and configured to generate an air flow in the in-case passage; and a cooling passage portion defining a motor cooling passage in which the air flows to cool the blower motor. The blower is arranged downstream of the cooler with respect to the air flow in the air conditioning case. The motor cooling passage includes a passage inlet opened and located downstream of the impeller with respect to the air flow in the in-case passage and a passage outlet opened and located upstream of the impeller with respect to the air flow in the in-case passage.

BRIEF DESCRIPTION OF DRAWINGS

The above and other objects, features and advantages of the present disclosure will become more apparent from the following detailed description made with reference to the accompanying drawings.

DETAILED DESCRIPTION

Figure 1:
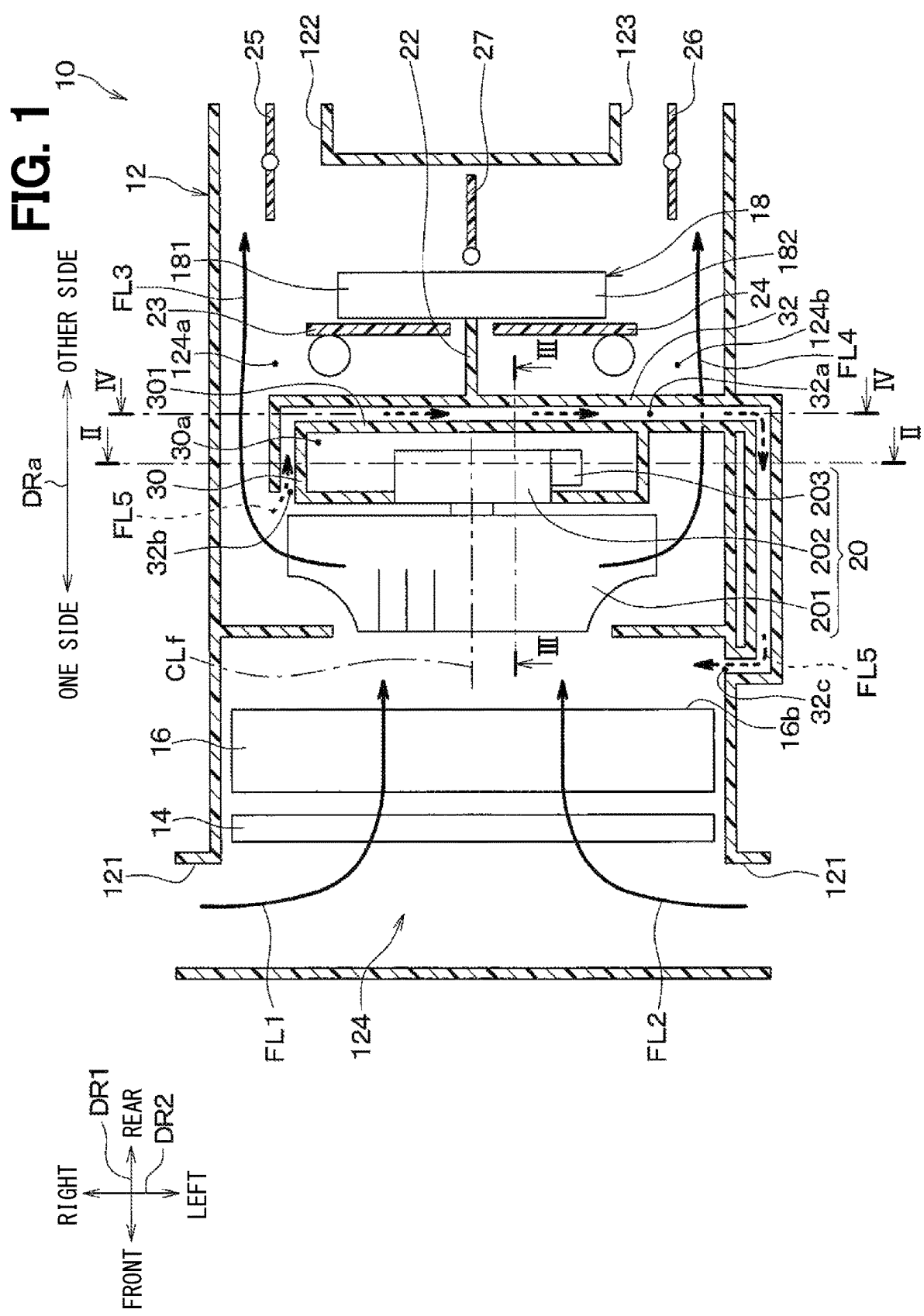
FIG. 1 is a schematic cross-sectional view showing a schematic configuration of an air conditioning unit for a vehicle according to a first embodiment.

An indoor air conditioning unit may be one type of an air conditioning unit for a vehicle. In the indoor air conditioning unit, a blower is located downstream of an evaporator with respect to an air flow. The blower includes a blower motor which is an electric motor and a fan which is an impeller rotated by the blower motor to generate the air flow.

In the indoor air conditioning unit described above, in order to restrict the blower motor from being overcooled by cold air flowing from the evaporator and condensation water from being generated at the blower motor, vehicle interior air in a temperature higher than that of the cold air flowing from the evaporator is introduced to a space in which the blower motor is housed. After that, the vehicle interior air cools the blower motor, and subsequently, flows out to an upstream of the fan with respect to the air flow and is sucked into the fan. That is, because of negative pressure generated at the upstream of the fan by operating the fan, the vehicle interior air is introduced into the space in which the blower motor is housed.

In the indoor air conditioning unit described above, the negative pressure, which is generated at the upstream of the fan by operating the fan, is used so as to introduce the vehicle interior air as cooling air to cool the blower motor. Therefore, for example, the upstream of the fan is under positive pressure because ram pressure is applied through an outside air suction port arranged at the upstream of the fan during a vehicle travel. In this case, the cooling air at an adequate air volume may be difficult to be secured. Further, outside air may flow back from the upstream of the fan and leak to a vehicle interior through a cool passage such that the cooling air flows from the vehicle interior to the upstream of the fan. The problems as described above have been found by detail studies of the inventors of the present application.

In view of the above points, it is an object of the present disclosure to provide an air conditioning unit for a vehicle, configured to cool a blower motor by air without regard to application of ram pressure.

An air conditioning unit for a vehicle in one exemplar according to the present disclosure includes: an air conditioning case defining an in-case passage in which air flows to a vehicle interior; a cooler arranged in the air conditioning case and configured to cool the air that flows in the in-case passage; a blower that includes a blower motor and an impeller rotated by the blower motor and configured to generate an air flow in the in-case passage; and a cooling passage portion defining a motor cooling passage in which the air flows to cool the blower motor. The blower is arranged downstream of the cooler with respect to the air flow in the air conditioning case. The motor cooling passage includes a passage inlet opened and located downstream of the impeller with respect to the air flow in the in-case passage and a passage outlet opened and located upstream of the impeller with respect to the air flow in the in-case passage.

As described above, in the motor cooling passage, the passage inlet is opened at a downstream of the impeller with respect to the air flow in the in-case passage, and the passage outlet is opened at an upstream of the impeller with respect to the air flow in the in-case passage. Therefore, when operating the fan in which the impeller rotates, the air flows from the passage inlet to the passage outlet in the motor cooling passage, and the air passing through the motor cooling passage can cool the blower motor.

An air flow in the motor cooling passage is generated by a static pressure difference between the upstream and the downstream of the impeller with respect to the air flow. The static pressure difference is caused by the rotation of the impeller. Therefore, without regard to the application of the ram pressure caused by vehicle travel, a volume of the air flowing in the motor cooling passage can be secured.

Hereinafter, each embodiment will be described with reference to the drawings. In the following embodiments, the same or equivalent parts are denoted by the same reference numerals as each other, and explanations will be provided to the same reference numerals.

First Embodiment

Figure 2:
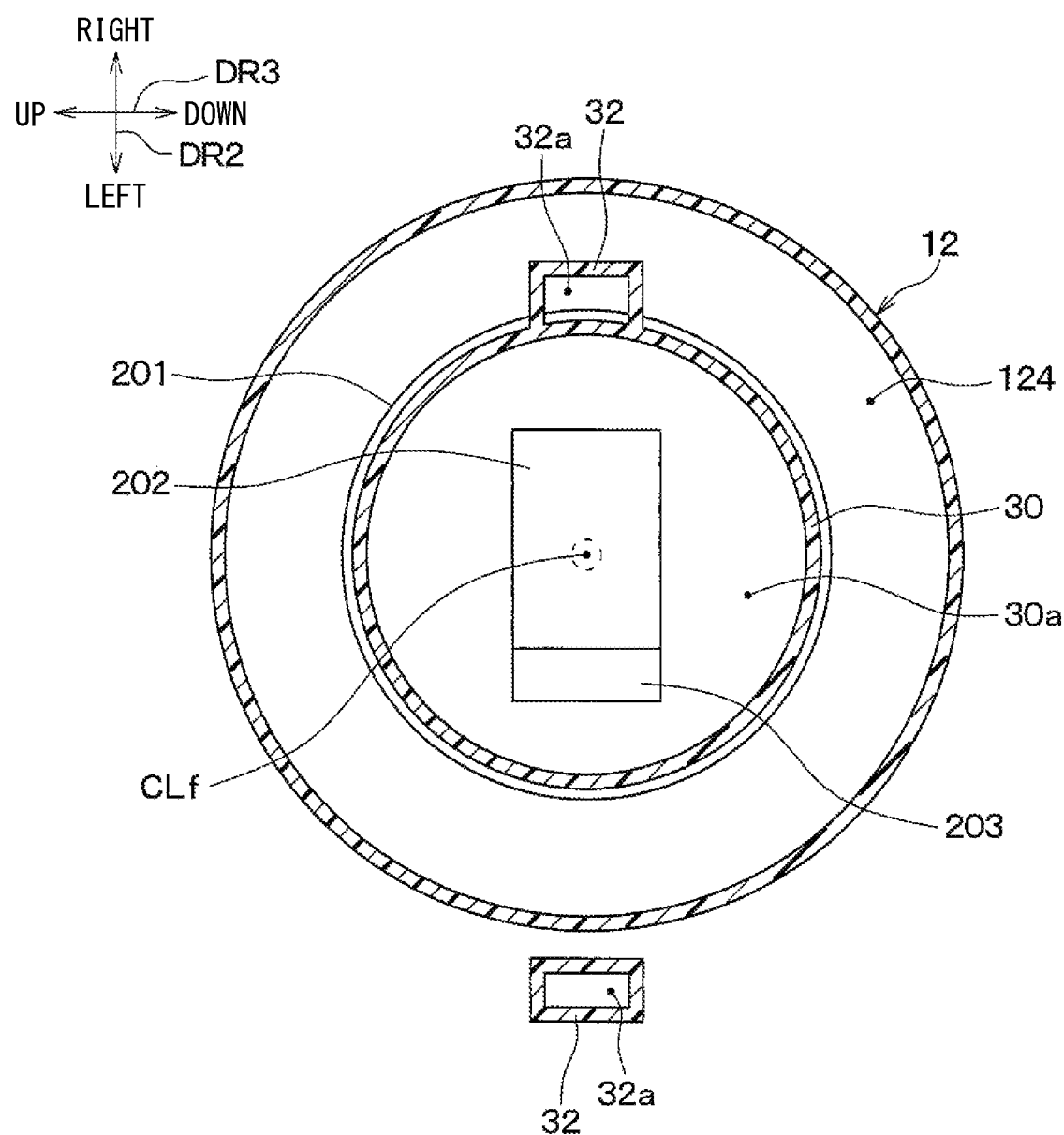
FIG. 2 is a schematic cross-sectional view showing a cross section taken along a line II-II of FIG. 1 in the first embodiment.

As shown in FIG. 1, a vehicle air conditioning unit 10 of the present embodiment includes an air conditioning case 12, a filter 14, an evaporator 16, a heater core 18, a blower 20, and multiple doors 23, 24, 25, 26, 27. The vehicle air conditioning unit 10 is arranged in a vehicle interior, for example, inside an instrument panel provided at a foremost portion in the vehicle interior. Arrows DR1, DR2 in FIG. 1 and an arrow DR3 in FIG. 2 represent directions with respect to a vehicle including the vehicle air conditioning unit 10. Specifically, the arrow DR1 in FIG. 1 represents a front-rear direction DR1 of the vehicle, and the arrow DR2 represents a left-right direction DR2 of the vehicle, that is a vehicle width direction DR2. In FIG. 2, the arrow DR3 represents an up-down direction DR3 of the vehicle.

The air conditioning case 12 is made of resin and forms an outer shell of the vehicle air conditioning unit 10. The air conditioning case 12 includes multiple air introduction portions 121 and multiple outlet openings 122, 123. An in-case passage 124 in which air flows is formed in the air conditioning case 12. An air vent is formed at each of the multiple air introduction portions 121 to introduce outside air, which is air outside the vehicle interior, or inside air, which is air inside the vehicle interior, from an outside of the air conditioning case 12 into the in-case passage 124. The air vent of the air introduction portion 121 is provided at an upstream side of the in-case passage 124 with respect to an air flow. Unillustrated inside-outside air switching doors are arranged at the air introduction portions 121, respectively, and configured to switch air flowing into the air introduction portions 121 between the inside air and the outside air.

Further, an air vent is formed at each of the multiple outlet openings 122, 123 to discharge the air from the in-case passage 124 to the vehicle interior located outside the air conditioning case 12. The air vent of each outlet opening 122, 123 is provided at a downstream side position of the in-case passage 124 with respect to the air flow. Therefore, the air in the in-case passage 124 flows out to the vehicle interior through the outlet opening 122, 123. Here, arrows FL1, FL2, FL3, FL4 in FIG. 1 show air flows in the in-case passage 124.

The filter 14 is arranged in the air conditioning case 12. Specifically, the filter 14 is arranged downstream of the multiple air introduction portions 121 with respect to the air flow in the in-case passage 124. The filter 14 filters out dust and the like included in the air passing through the filter 14. Therefore, the air flows to the downstream of the filter 14 with respect to the air flow in the in-case passage 124 after the dust and the like in the air are removed by the filter 14.

The evaporator 16 is a cooling heat exchanger configured to cool the air passing through the evaporator 16. That is, the evaporator 16 is a cooler.

The evaporator 16 is arranged in the air conditioning case 12. More specifically, the evaporator 16 is disposed in the in-case passage 124, and the air having been introduced to the in-case passage 124 flows into the evaporator 16 after passing through the filter 14. In addition, the evaporator 16 is configured to cool the air flowing in the in-case passage 124.

For example, the evaporator 16 constitutes a known refrigeration cycle device configured to circulate a refrigerant together with a compressor, a condenser, and an expansion valve (not shown). The evaporator 16 is configured to exchange heat between the air passing through the evaporator 16 and the refrigerant, and to evaporate the refrigerant and cool the air by the heat exchange.

The blower 20 includes a blower fan 201, a blower motor 202, and a motor radiation fin 203. The blower fan 201 is arranged in the in-case passage 124 and configured to rotate around a fan axis CLf. The blower motor 202 is configured to drive and rotate the blower fan 201. The motor radiation fin 203 is configured to dissipate heat of the blower motor 202. The blower 20 is located downstream of the evaporator 16 with respect to the air flow in the air conditioning case 12.

The blower fan 201 is an impeller rotated by the blower motor 202 to generate the air flow in the in-case passage 124. In the present embodiment, the blower fan 201 is a centrifugal fan, and the blower 20 is a centrifugal blower, for example.

The blower 20 is configured to draw the air at one side in an axial direction DRa of the fan axis CLf by rotation of the blower fan 201, and blows out the drawn air outward in a radial direction of the blower fan 201. The air blown outward in the radial direction from the blower 20 is guided by an inner wall of the air conditioning case 12 as shown by the arrows FL3, FL 4. Therefore, the air flows toward the downstream of the blower fan 201 with respect to the air flow (for example, a rear side in the front-rear direction DR1 of the vehicle in FIG. 1) in the in-case passage 124.

The axial direction DRa of the fan axis CLf is not necessarily to coincide with the front-rear direction DR1 of the vehicle; however, in the present embodiment, the axial direction DRa of the fan axis CLf coincides with the front-rear direction DR1 of the vehicle. Further, the axial direction DRa of the fan axis CLf may be referred to as fan axial direction DRa. In addition, the radial direction of the blower fan 201 is a radial direction with respect to the fan axis CLf. The radial direction with respect to the fan axis CLf is may be referred to as fan radial direction.

The blower motor 202 is an electric motor configured to rotate the blower fan 201 by being energized. The blower motor 202 also includes an electric circuit to drive the motor, in addition to a motor rotor and a motor stator. As the blower motor 202 is energized, the blower fan 201 generates heat accompanied by being rotated. In addition, the motor radiation fin 203 is connected to the blower motor 202 such that the heat is transferable.

The blower 20 has a so-called suction-type layout in which the blower fan 201 is located downstream of the evaporator 16 with respect to the air flow. One side surface of the blower 20 in the fan axial direction DRa, which is an air suction side of the blower fan 201, faces an air outflow surface 16b of the evaporator 16. In addition, the blower fan 201 is arranged such that the other side surface of the blower fan 201 in the fan axial direction DRa faces towards the downstream side with respect to the air flow in the in-case passage 124. The above "other side in the fan axial direction DRa" is the other side of the blower fan 201 in the fan axis CLf.

The vehicle air conditioning unit 10 includes an in-case partition wall 22 which divides an passage located downstream of the blower fan 201 with respect to the air flow into two downstream passages 124a, 124b in the in-case passage 124. The downstream passages 124a, 124b extends in parallel with each other. Each of the two downstream passages 124a, 124b corresponds to a first downstream passage 124a and a second downstream passage 124b. The first downstream passage 124a is provided at a rightward position of the in-case partition wall 22 in the vehicle width direction DR2. The second downstream passage 124b is provided at a leftward position of the in-case partition wall 22 in the vehicle width direction DR2.

The heater core 18 is located downstream of the blower fan 201 with respect to the air flow in the air conditioning case 12. In other words, the heater core 18 is located downstream of the blower fan 201 with respect to the air flow in the in-case passage 124. The heater core 18 is a heater (in other words, a heating heat exchanger) configured to heat the air blown from the blower fan 201. More specifically, the heater core 18 is configured to heat the air passing through the heater core 18 in the air blown from the blower fan 201.

The heater core 18 extends across both the first downstream passage 124a and the second downstream passage 124b. The heater core 18 includes a first heating portion 181 located in the first downstream passage 124a and a second heating portion 182 located in the second downstream passage 124b.

A first air-volume ratio adjusting door 23 and a second air-volume ratio adjusting door 24 are called air mix doors and arranged downstream of the blower fan 201 with respect to the air flow in the air conditioning case 12. For example, the first air-volume ratio adjusting door 23 and the second air-volume ratio adjusting door 24 are slide type door mechanisms and are slid by an electric actuator.

More specifically, the first air-volume ratio adjusting door 23 is arranged upstream of the first heating portion 181 of the heater core 18 with respect to the air flow in the first downstream passage 124a. The first air-volume ratio adjusting door 23 is configured to adjust a ratio of air volume passing through the first heating portion 181 to air volume bypassing the first heating portion 181. In this way, the first air-volume ratio adjusting door 23 is configured to adjust a temperature of the air blown into the vehicle interior through the first downstream passage 124a.

The second air-volume ratio adjusting door 24 is arranged upstream of the second heating portion 182 of the heater core 18 with respect to the air flow in the second downstream passage 124b. The second air-volume ratio adjusting door 24 adjusts a ratio of air volume passing through the second heating portion 182 to air volume of bypassing the second heating portion 182. In this way, the second air-volume ratio adjusting door 2 is configured to adjust a temperature of the air blown into the vehicle interior through the second downstream passage 124b.

The air conditioning case 12 includes the first outlet opening 122 located downstream of the first heating portion 181 of the heater core 18 with respect to the air flow in the first downstream passage 124a. In addition, the air conditioning case 12 includes the second outlet opening 123 located downstream of the second heating portion 182 of the heater core 18 with respect to the air flow in the second downstream passage 124b. A plurality of the first outlet openings 122 are provided practically, however, one of the multiple first outlet openings 122 is shown in FIG. 1 as a representative. As the second outlet opening 123 is similar to the first outlet opening 122 at this point, one of the multiple second outlet openings 123 is shown in FIG. 1 as a representative.

For example, a face outlet opening, a foot outlet opening, and a defroster outlet opening are provided as the multiple first outlet openings 122. Each of the first multiple outlet openings 122 is arranged so as to blow the air in the first downstream passage 124a toward a right side of a front seat area in the vehicle width direction DR2 in the vehicle interior. Multiple first outlet opening doors 25 are arranged at the multiple first outlet openings 122 and configured to open or close the first outlet openings 122, respectively.

The second outlet opening 123 is similar to the first outlet opening 122, except that a left-right position of the second outlet opening 123 is different from that of the first outlet opening 122 described above. For example, a face outlet opening, a foot outlet opening, and a defroster outlet opening are provided as the multiple second outlet openings 123. Each of the multiple second outlet openings 123 is arranged so as to blow the air in the second downstream passage 124b toward a left side of the front seat area in the vehicle width direction DR2 in the vehicle interior. Multiple second outlet opening doors 26 are arranged at the multiple second outlet openings 123 and configured to open or close the second outlet openings 123, respectively.

A downstream passage door 27 is arranged downstream of the heater core 18 with respect to the air flow in the in-case passage 124 and located at a boundary between the first downstream passage 124a and the second downstream passage 124b. The downstream passage door 27 is an opening/closing door. When the downstream passage door 27 is located at an opening position, the first downstream passage 124a and the second downstream passage 124b communicate with each other. When the downstream passage door 27 is located at a closing position, the downstream passage door 27 restricts communication between the first downstream passage 124a and the second downstream passage 124b.

Figure 3:
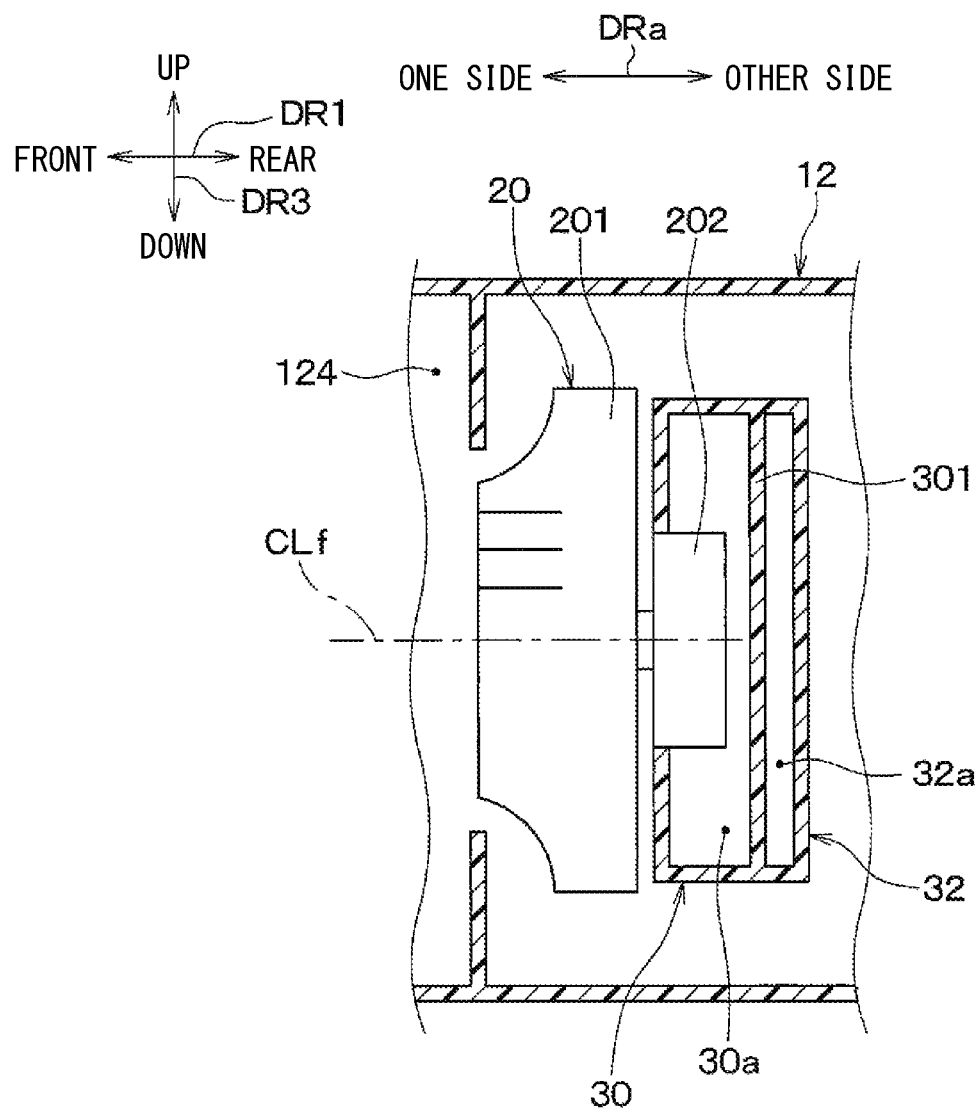
FIG. 3 is a schematic cross-sectional view showing a cross section taken along a line III-III of FIG. 1 in the first embodiment.

As shown in FIGS. 1 to 3, the vehicle air conditioning unit 10 includes a motor space forming portion 30 arranged in the air conditioning case 12. The motor space forming portion 30 forms a motor space 30a, in which the blower motor 202 and the motor radiation fin 203 are arranged, and is configured to separate the motor space 30a from the in-case passage 124.

Specifically, the motor space forming portion 30 is surrounded by the in-case passage 124. The motor space forming portion 30 forms the motor space 30a inside the motor space forming portion 30, and the blower motor 202 and the motor radiation fin 203 are housed in the motor space 30a.

A state in which the blower motor 202 is housed in the motor space 30a is not limited to a state in which an entirety of the blower motor 202 is housed in the motor space 30a. Most of the blower motor 202 may be located in the motor space 30a. Thereby, when the most of the blower motor 202 is located in the motor space 30a, it can be said that the blower motor 202 is housed in the motor space 30a, even in a state that a part of a rotational shaft or a non-rotating part in the blower motor 202 is exposed to an outside of the motor space 30a. A state in which the motor radiation fin 203 is housed in the motor space 30a is similar to this.

Because communication between the motor space 30a and the in-case passage 124 is restricted by the motor space forming portion 30, the motor space 30a is formed as a closed space which is closed. The motor space forming portion 30 is configured as a partition wall which separates the motor space 30a from the in-case passage 124. The communication between the motor space 30a and the in-case passage 124 is preferred to be completely blocked, however, the motor space 30a may slightly communicate with the in-case passage 124 through a small gap or the like for reason of manufacturing or the like.

The blower motor 202, the motor radiation fin 203, and the motor space forming portion 30 are located on the other side in the fan axial direction DRa than the blower fan 201. In one example, the motor space forming portion 30 is fixed to the air conditioning case 12, and the non-rotating part of the blower motor 202 is fixed to the air conditioning case 12 through the motor space forming portion 30.

Figure 4:
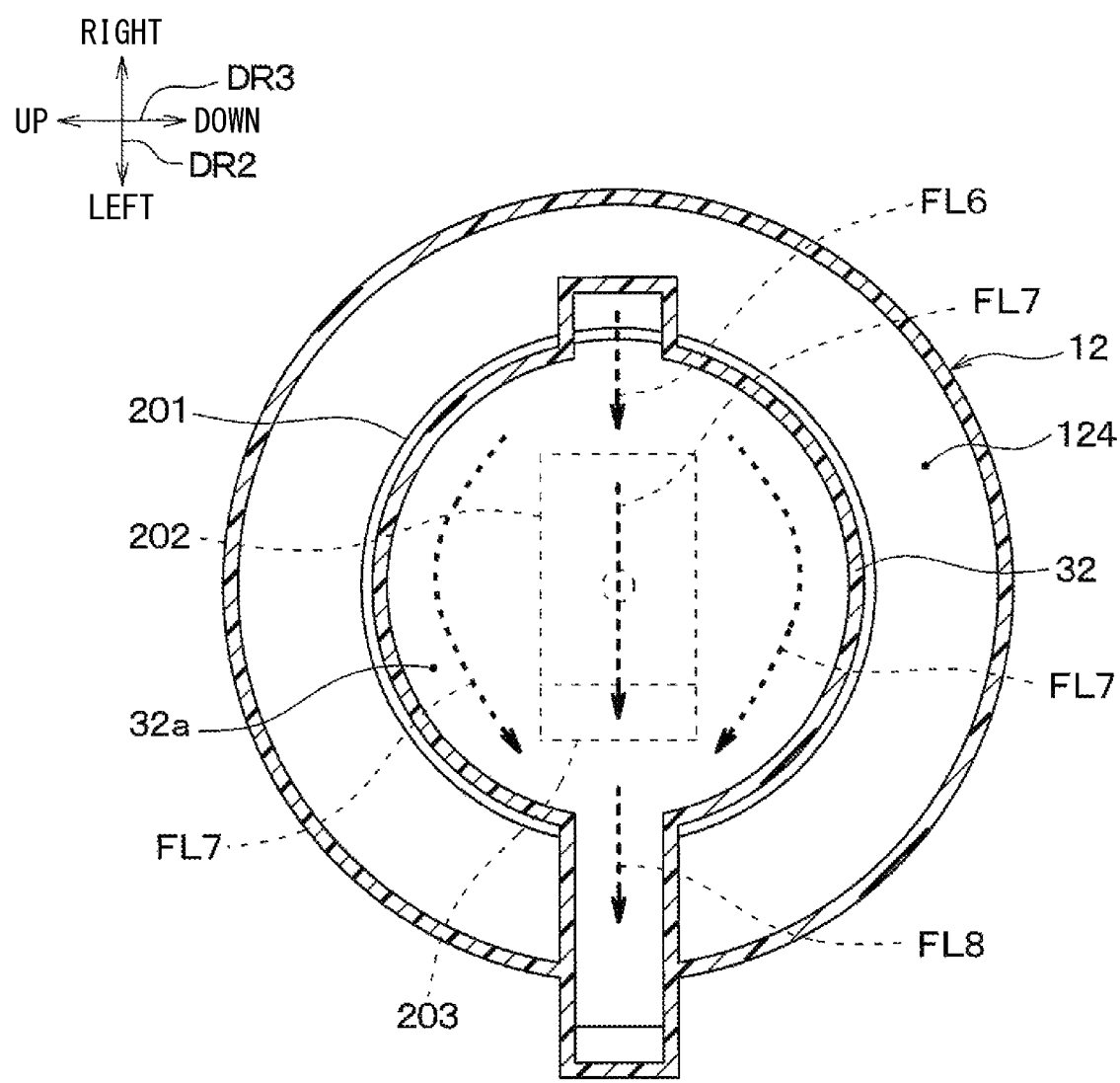
FIG. 4 is a schematic cross-sectional view showing a cross section taken along a line IV-IV of FIG. 1 in the first embodiment.

As shown in FIGS. 1 and 4, the vehicle air conditioning unit 10 includes a cooling passage portion 32 which forms a motor cooling passage 32a through which air flows to cool the blower motor 202. In one example, the cooling passage portion 32 is integrated with the motor space forming portion 30. Arrow FL 5 in FIG. 1 and arrows FL 6, FL 7, FL 8 in FIG. 4 show air flows in the motor cooling passage 32a.

The motor cooling passage 32a includes a passage inlet 32b and a passage outlet 32c. The passage inlet 32b is an inlet through which the air flows into the motor cooling passage 32a from the in-case passage 124. The passage outlet 32c is an outlet through which the air in the motor cooling passage 32a flows out to the in-case passage 124. In the present embodiment, the cooling passage portion 32 is a wall formed in a tubular shape and extends from the passage inlet 32b to the passage outlet 32c. In addition, the cooling passage portion 32 may be partially enlarged.

The passage inlet 32b is opened at a downstream side of the blower fan 201 with respect to the air flow in the in-case passage 124. Further, referring to a positional relationship between the passage inlet 32b and the heater core 18 or the like, the passage inlet 32b is opened at the upstream of the heater core 18, the first and second air-volume ratio adjusting doors 23, 24 with respect to the air flow in the in-case passage 124.

On the other hand, the passage outlet 32c of the motor cooling passage 32a is opened at an upstream side of the blower fan 201 with respect to the air flow in the in-case passage 124. Further, referring to a positional relationship between the passage outlet 32c and the evaporator 16, the passage outlet 32c is opened at the downstream of the evaporator 16 with respect to the air flow in the in-case passage 124.

Further, in order to restrict inflow of the air from the passage outlet 32c into the motor cooling passage 32a, the passage outlet 32c is opened in a direction in which the passage outlet 32c does not receive dynamic pressure of the air flowing in the in-case passage 124. For example, the passage outlet 32c is opened toward the downstream with respect to the air flow in the motor cooling passage 32a, rather than the upstream with respect to the air flow.

Further, as shown in FIGS. 1 and 4, in the air conditioning case 12, the motor cooling passage 32a extends and passes between the blower motor 202 and the heater core 18. A width of the motor cooling passage 32a is enlarged at a position between the blower motor 202 and the heater core 18. Specifically, the motor cooling passage 32a is arranged between the blower motor 202 and the heater core 18 so as to cover an entirety of a surface of the blower motor 202 closer to the heater core 18. In FIG. 1, "the surface of the blower motor 202 closer to the heater core 18" is the other side of the blower motor 202 in the fan axial direction DRa.

As shown in FIGS. 1 and 3, a partition wall 301 is configured to be used as both of the motor space forming portion 30 and the cooling passage portion 32. The partition wall 301 is arranged between the motor space 30a and the motor cooling passage 32a and divides into the motor space 30a and the motor cooling passage 32a. That is, one wall surface of the partition wall 301 faces the motor space 30a, and the other wall surface of the partition wall 301 faces the motor cooling passage 32a. Therefore, heat can be exchanged between the air in the motor cooling passage 32a and the air in the motor space 30a through the partition wall 301. Further, the blower motor 202 is housed in the motor space 30a, and the cooling passage portion 32 is structured such that the heat is exchanged between the blower motor 202 and the air in the motor cooling passage 32a through the air in the motor space 30a.

In addition, because the motor space 30a and the motor cooling passage 32a are divided by the partition wall 301, communication between the motor space 30a and the motor cooling passage 32a is restricted. The communication between the motor space 30a and the motor cooling passage 32a is preferred to be completely blocked, however, the motor space 30a may be slightly communicated with the motor cooling passage 32a through a small gap or the like for the reason of the manufacturing or the like.

Figure 5:
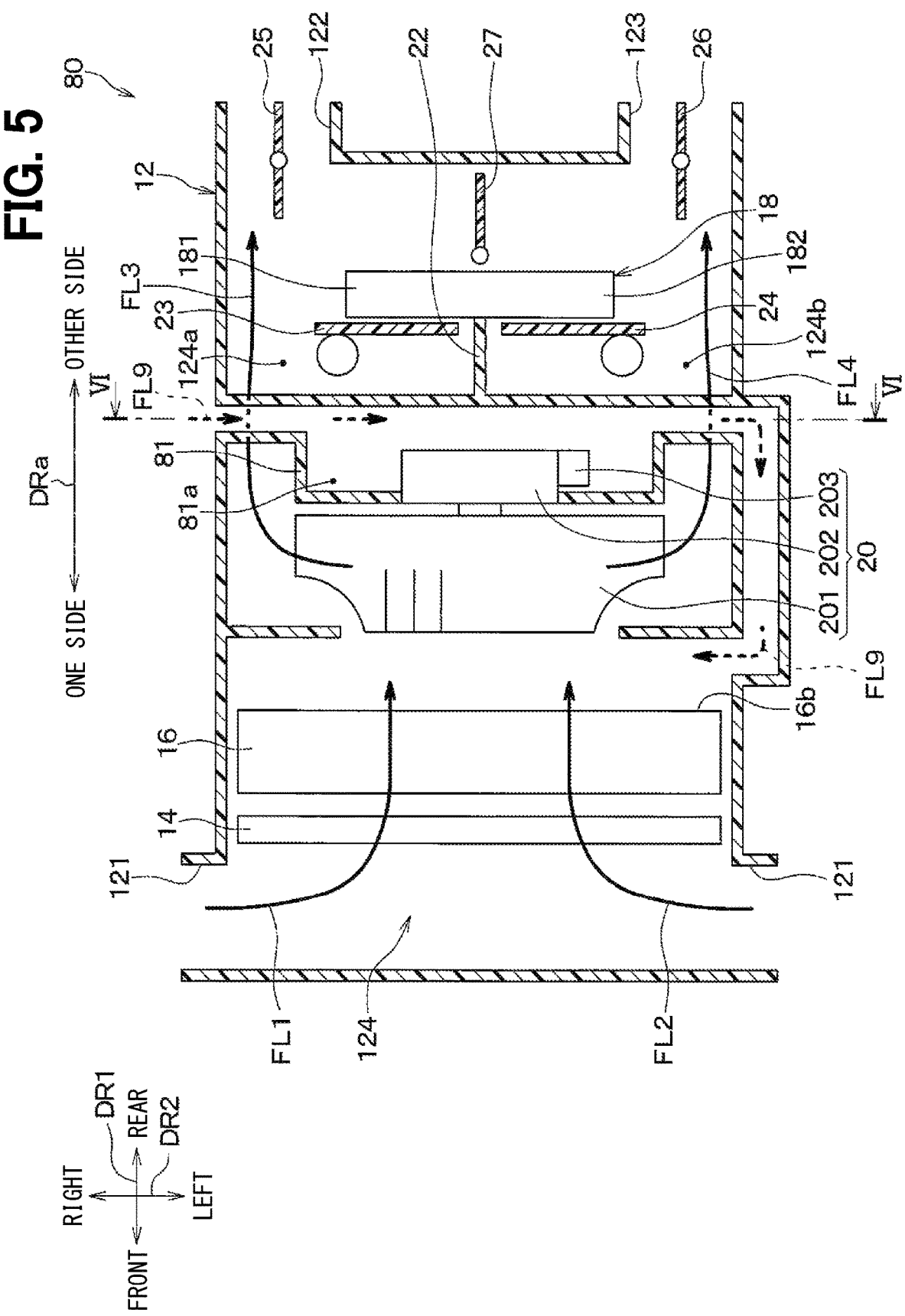
FIG. 5 is a schematic cross-sectional view showing a schematic configuration of an air conditioning unit for a vehicle in a comparative example, and is a view corresponding to FIG. 1.
Figure 6:
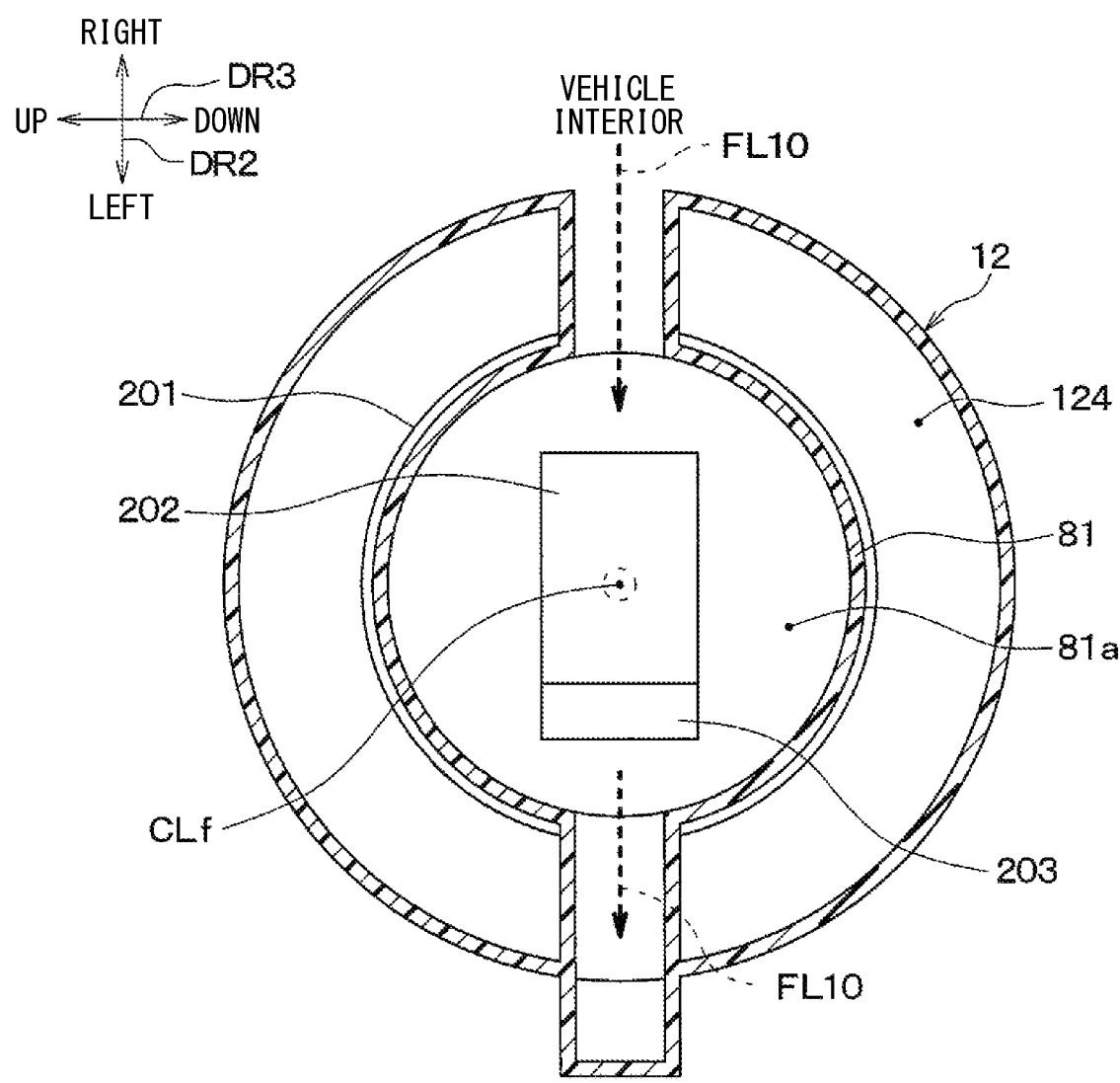
FIG. 6 is a schematic cross-sectional view showing a cross section taken along a line VI-VI of FIG. 5 in the comparative example.

Here, in order to describe the effect of the present embodiment, a comparative example will be described compared with the present embodiment. As shown in FIGS. 5 and 6, similarly to the vehicle air conditioning unit 10 of the present embodiment, a vehicle air conditioning unit 80 of the comparative example includes a motor space forming portion 81 which forms a motor space 81a. The blower motor 202 is housed in the motor space 81a. However, unlike the present embodiment, in the comparative example, the motor space 81a directly communicates with the vehicle interior and communicates with the in-case passage 124 at the upstream of the blower fan 201 with respect to the air flow in the in-case passage 124, as shown in FIGS. 5 and 6.

In the above configuration of the comparative example, by the negative pressure generated by the rotation of the blower fan 201 at the upstream of the blower fan 201 with respect to the air flow, the inside air is introduced as cooling air from the vehicle interior to the motor space 81a, as shown by arrows FL9 and FL10. After that, the blower motor 202 is cooled by the inside air introduced as the cooling air.

However, when the outside air can be introduced through the air introduction portion 121, ram pressure is applied to the in-case passage 124 through the air introduction portion 121 by the vehicle travel, and the upstream of the blower fan 201 with respect to the air flow may be under positive pressure in the in-case passage 124. That is, air pressure at the upstream of the blower fan 201 with respect to the air flow may be higher than air pressure in the vehicle interior. In this case, in the vehicle air conditioning unit 80 according to the comparative example, air volume of the inside air introduced to the motor space 81a, that is air volume of the cooling air to cool the blower motor 202, may not be secured sufficiently. Further, the outside air may flow in the passage, instead of the cooling air, toward a direction opposite to a direction shown by arrows FL9, FL10, and the outside air may leak into the vehicle interior through the motor space 81a.

In the present embodiment, as shown in FIG. 1, the passage inlet 32b of the motor cooling passage 32a is opened immediately downstream of the blower fan 201 with respect to the air flow in the in-case passage 124. In addition, the passage outlet 32c of the motor cooling passage 32a is opened upstream of the blower fan 201 with respect to the air flow in the in-case passage 124. Therefore, when the blower fan 201 operates and rotates, the air flows from the passage inlet 32b to the passage outlet 32c in the motor cooling passage 32a, as shown by the arrow FL5. As a result, the air flowing in the motor cooling passage 32a is enabled to cool the blower motor 202.

The air flow in the motor cooling passage 32a is generated by a static pressure difference, caused by the rotation of the blower fan 201, between the upstream and the downstream of the blower fan 201 with respect to the air flow. Because of the static pressure difference, static pressure at the upstream of the blower fan 201 with respect to the air flow is always higher than that at the downstream of the blower fan 201 with respect to the air flow. Therefore, without regard to the application of the ram pressure caused by the vehicle travel, the air volume flowing in the motor cooling passage 32a (that is, the air volume of the cooling air to cool the blower motor 202) can be secured.

In the present embodiment, unlike the comparative example, portions located upstream of the blower fan 201 with respect to the air flow in the in-case passage 124 do not directly communicate with the vehicle interior, and the outside air does not leak to the vehicle interior.

Further, in the present embodiment, the motor space forming portion 30 is located in the air conditioning case 12. The motor space forming portion 30 separates the motor space 30a, in which the blower motor 202 and the motor radiation fin 203 are arranged, from the in-case passage 124. The cooling passage portion 32 is configured such that the heat is exchanged between the blower motor 202 and the air in the motor cooling passage 32a through the air in the motor space 30a. Because of this, cold air cooled by the evaporator 16 does not directly hit the blower motor 202 and can indirectly cool the blower motor 202. Therefore, supercooling of the blower motor 202 can be restricted, and the blower motor 202 can be protected from condensation caused by the supercooling.

In the present embodiment, the passage inlet 32b of the motor cooling passage 32a is opened upstream of the heater core 18 and the first and second air-volume ratio adjusting doors 23, 24 with respect to the air flow in the in-case passage 124. Therefore, the cold air before being heated by the heater core 18 can be introduced into the motor cooling passage 32a from the passage inlet 32b, without being affected by an operating state of the first and second air-volume ratio adjusting doors 23, 24.

In the present embodiment, within the air conditioning case 12, the motor cooling passage 32a extends between the blower motor 202 and the heater core 18. Therefore, the air in the motor cooling passage 32a can restrict the blower motor 202 from receiving the heat from the heater core 18.

Second Embodiment

A second embodiment of the present disclosure will be described as follows. The present embodiment will be explained primarily with respect to portions different from those of the first embodiment. In addition, explanations of the same or equivalent portions as those in the above embodiment will be omitted or simplified. The same applies to a description of embodiments as described later.

Figure 7:
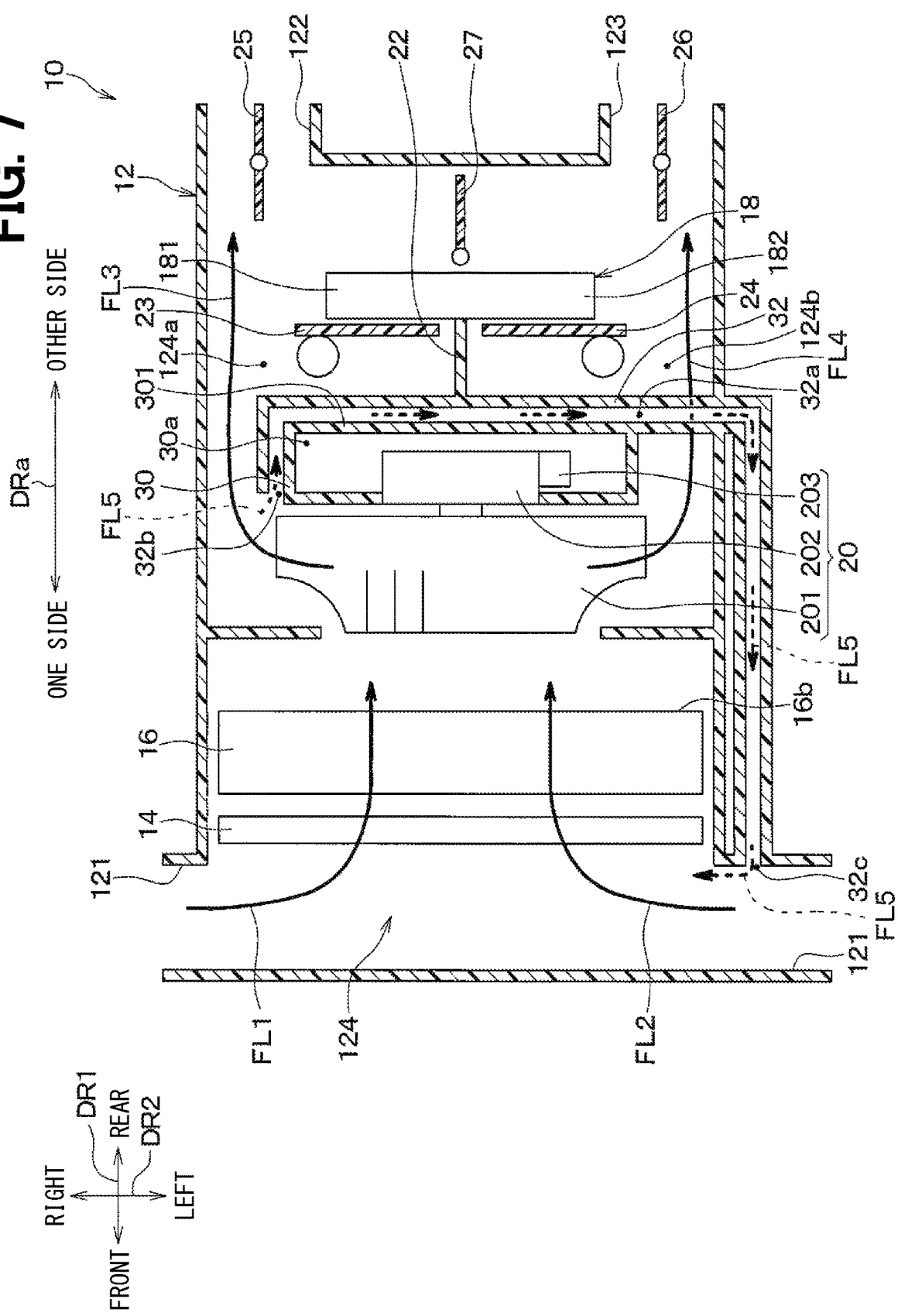
FIG. 7 is a schematic cross-sectional view showing a schematic configuration of an air conditioning unit for a vehicle in a second embodiment, and is a view corresponding to FIG. 1.

As shown in FIG. 7, in the present embodiment, the position of the passage outlet 32c of the motor cooling passage 32a is different from that in the first embodiment.

Specifically, the passage outlet 32c of the present embodiment is provided between the air introduction portion 121 and the filter 14 in the in-case passage 124. That is, the passage outlet 32c is opened at the upstream of the evaporator 16 with respect to the air flow in the in-case passage 124.

Because of the above arrangement of the passage outlet 32c, the air flowing out from the motor cooling passage 32a can flow to the evaporator 16 and can be cooled again by the evaporator 16. Therefore, the evaporator 16 is enabled to cancel out temperature rising of the air in the motor cooling passage 32a associated with cooling of the blower motor 202, and a temperature of the air blown from the vehicle air conditioning unit 10 can be protected regardless the effect of heat generation at the blower motor 202.

Aside from the above described aspects, the present embodiment is the same as the first embodiment. Further, in the present embodiment, the same effects as the first embodiment described above can be obtained in the same manner as in the first embodiment.

Third Embodiment

Next, a third embodiment will be described. The present embodiment will be explained primarily with respect to portions different from those of the first embodiment.

Figure 8:
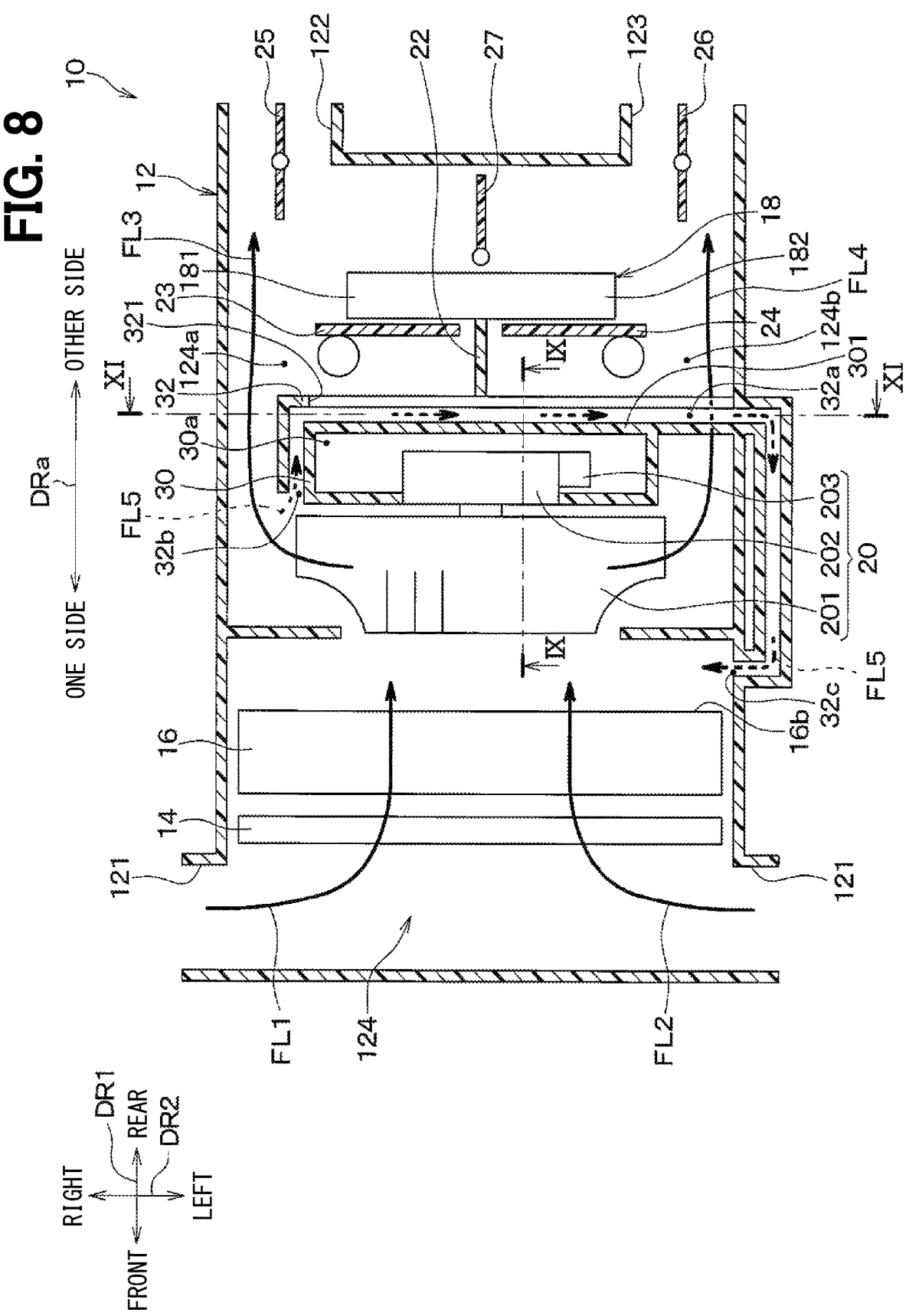
FIG. 8 is a schematic cross-sectional view showing a schematic configuration of an air conditioning unit for a vehicle in a third embodiment, and is a view corresponding to FIG. 1.
Figure 9:
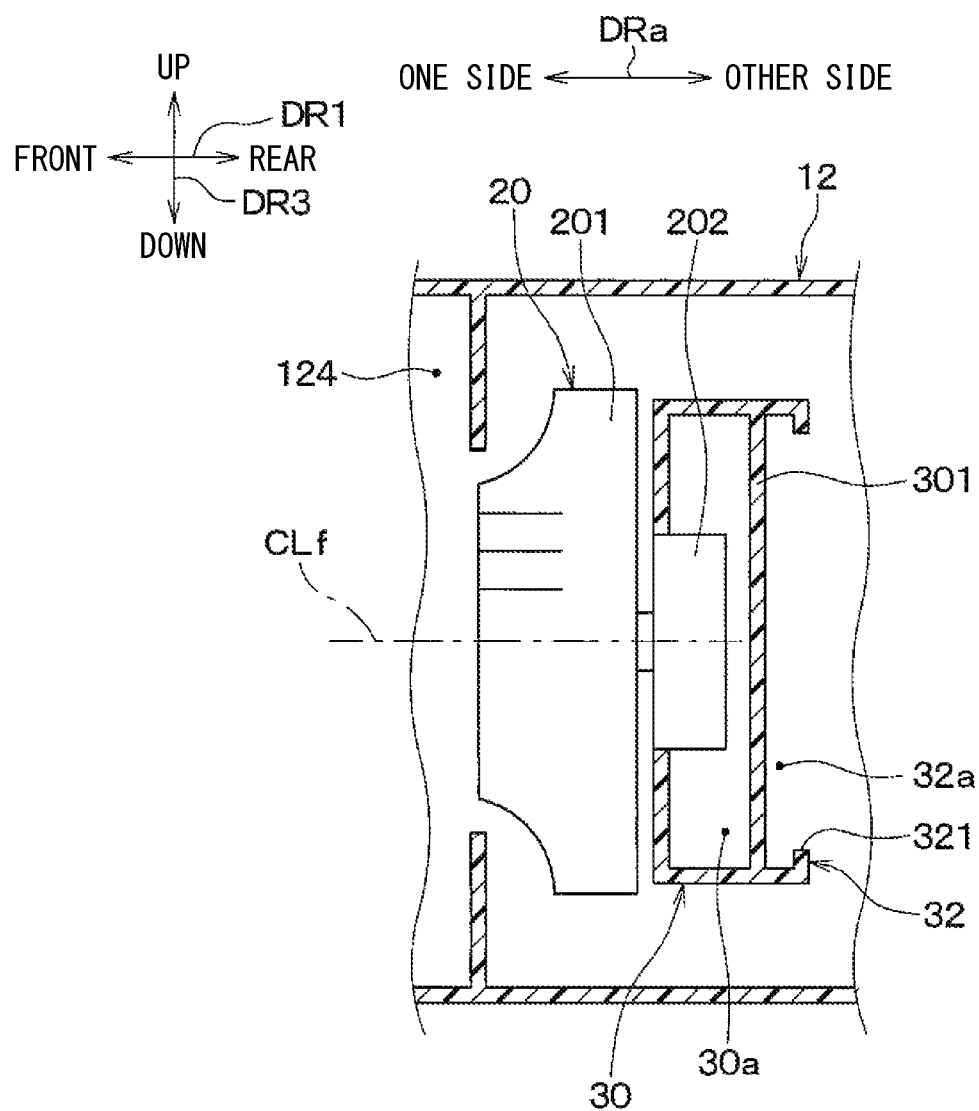
FIG. 9 is a schematic cross-sectional view showing a cross section taken along a line IX-IX of FIG. 8 in the third embodiment, and is a view corresponding to FIG. 3.

As shown in FIGS. 8 and 9, the cooling passage portion 32 of the present embodiment includes a passage opening 321 at which the motor cooling passage 32a is partially opened. That is, the motor cooling passage 32a is partially opened between the passage inlet 32b and the passage outlet 32c, to the in-case passage 124.

Because the motor cooling passage 32a is formed as described above, when the fan is operated, while the air flows through the passage opening portion 321 into the motor cooling passage 32a, the air in the motor cooling passage 32a flows from the passage inlet 32b to the passage outlet 32c as shown by an arrow FL5.

As described above, in the cooling passage portion 32, the motor cooling passage 32a is partially opened. Therefore, for example, a mold removing is facilitated because of the above opened shape, and a formability of members including the cooling passage portion 32 can be improved.

Aside from the above described aspects, the present embodiment is the same as the first embodiment. Further, in the present embodiment, the same effects as the first embodiment described above can be obtained in the same manner as in the first embodiment.

Note that the present embodiment is a modification based on the first embodiment, but it is possible to combine the present embodiment with the second embodiment described above.

Fourth Embodiment

Figure 10:
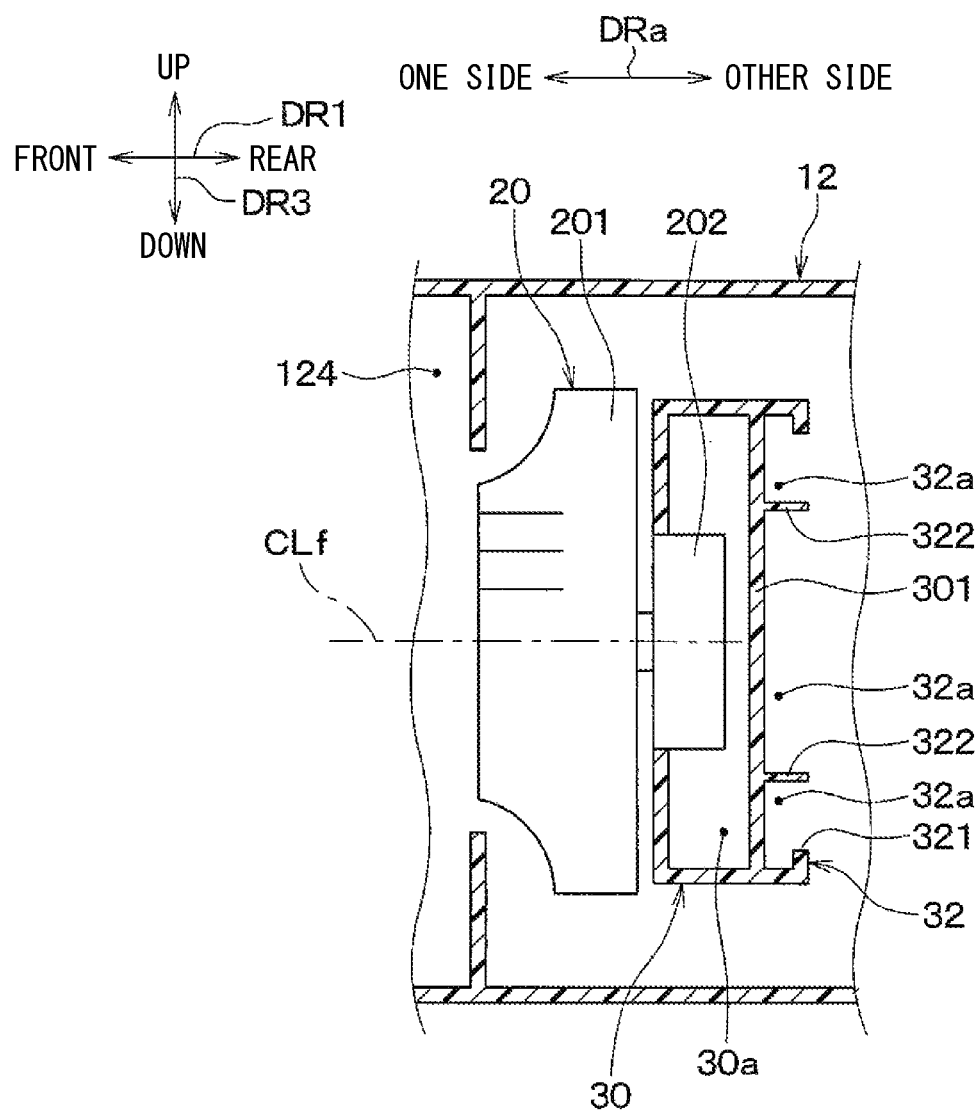
FIG. 10 is a schematic cross-sectional view showing a cross section taken along a line IX-IX of FIG. 8 in a fourth embodiment, and is a view corresponding to FIG. 9.
Figure 11:
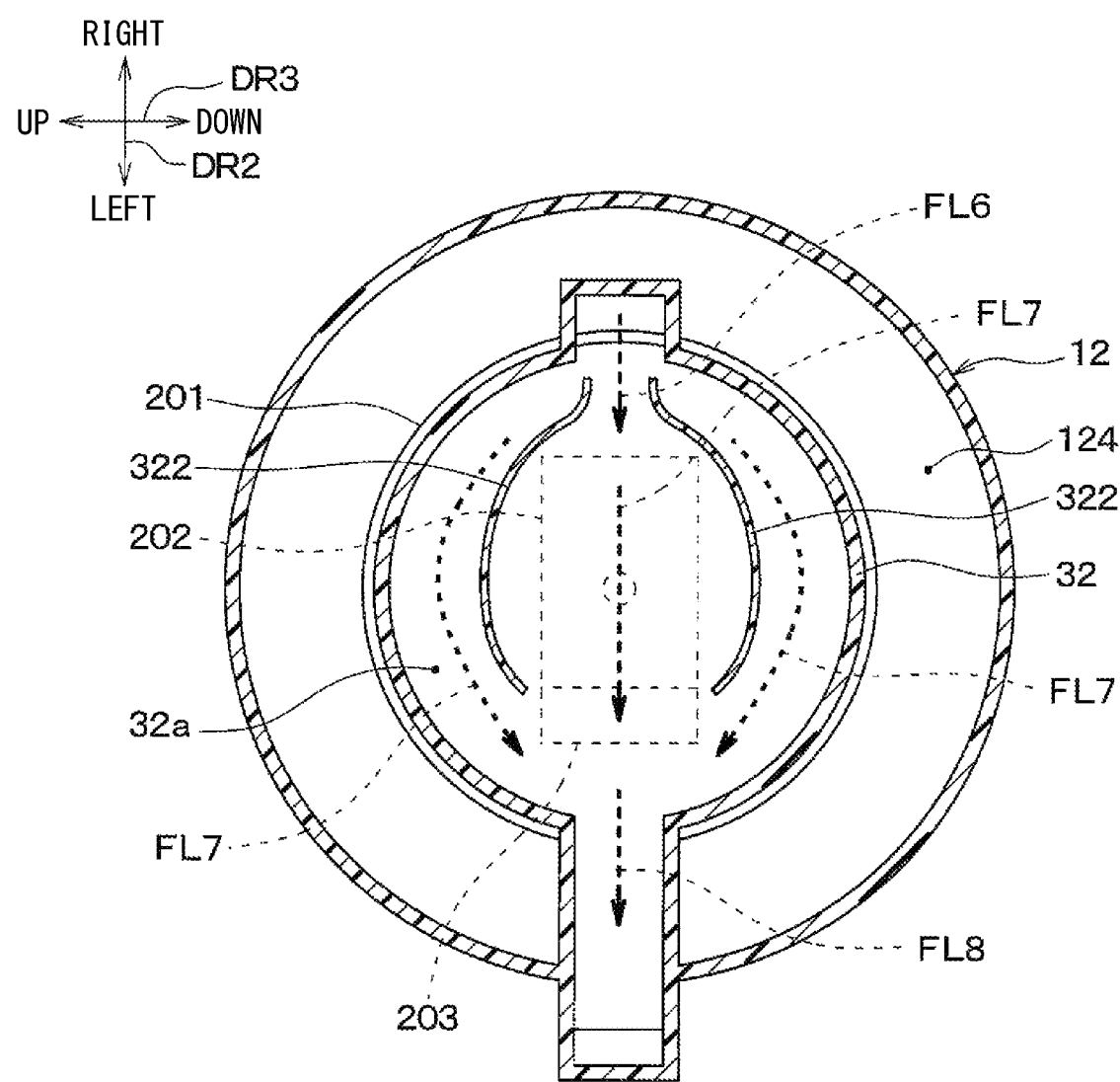
FIG. 11 is a schematic cross-sectional view showing a cross section taken along a line XI-XI of FIG. 8 in the fourth embodiment, and is a view corresponding to FIG. 4.

A fourth embodiment will be described below. The present embodiment will be explained mainly with respect to portions different from those of the third embodiment. As shown in FIGS. 10 and 11, the cooling passage portion 32 of the present embodiment includes a plate portion 322 formed in a plate shape and configured as a heat exchanger fin arranged in the motor cooling passage 32*a*. The plate portion 322 is configured to promote the heat exchange between the air in the motor space 30*a* and the air in the motor cooling passage 32*a*. That is, the plate portion 322 is configured to promote the heat exchange between the blower motor 202 arranged in the motor space 30*a* and the air in the motor cooling passage 32*a*.

Specifically, the multiple plate portions 322 protrude from the partition wall 301 to the motor cooling passage 32*a*. The plate portion 322 is a rib guide which extends along the air flow direction in the motor cooling passage 32*a*.

As described above, in the present embodiment, the plate portion 322 functions as the heat exchange fin. Therefore, compared to a case without the plate portion 322, cooling of the blower motor 202 can be promoted.

Aside from the above described aspects, the present embodiment is the same as the third embodiment. Further, in the present embodiment, the same effects as the third embodiment described above can be obtained in the same manner as in the third embodiment.

The fourth embodiment is a modification based on the third embodiment; however, the plate portion 322 of the present embodiment may be similarly arranged in the first embodiment or the second embodiment described above.

Fifth Embodiment

Next, a fifth embodiment will be described. The present embodiment will be explained primarily with respect to portions different from those of the first embodiment.

Figure 12:
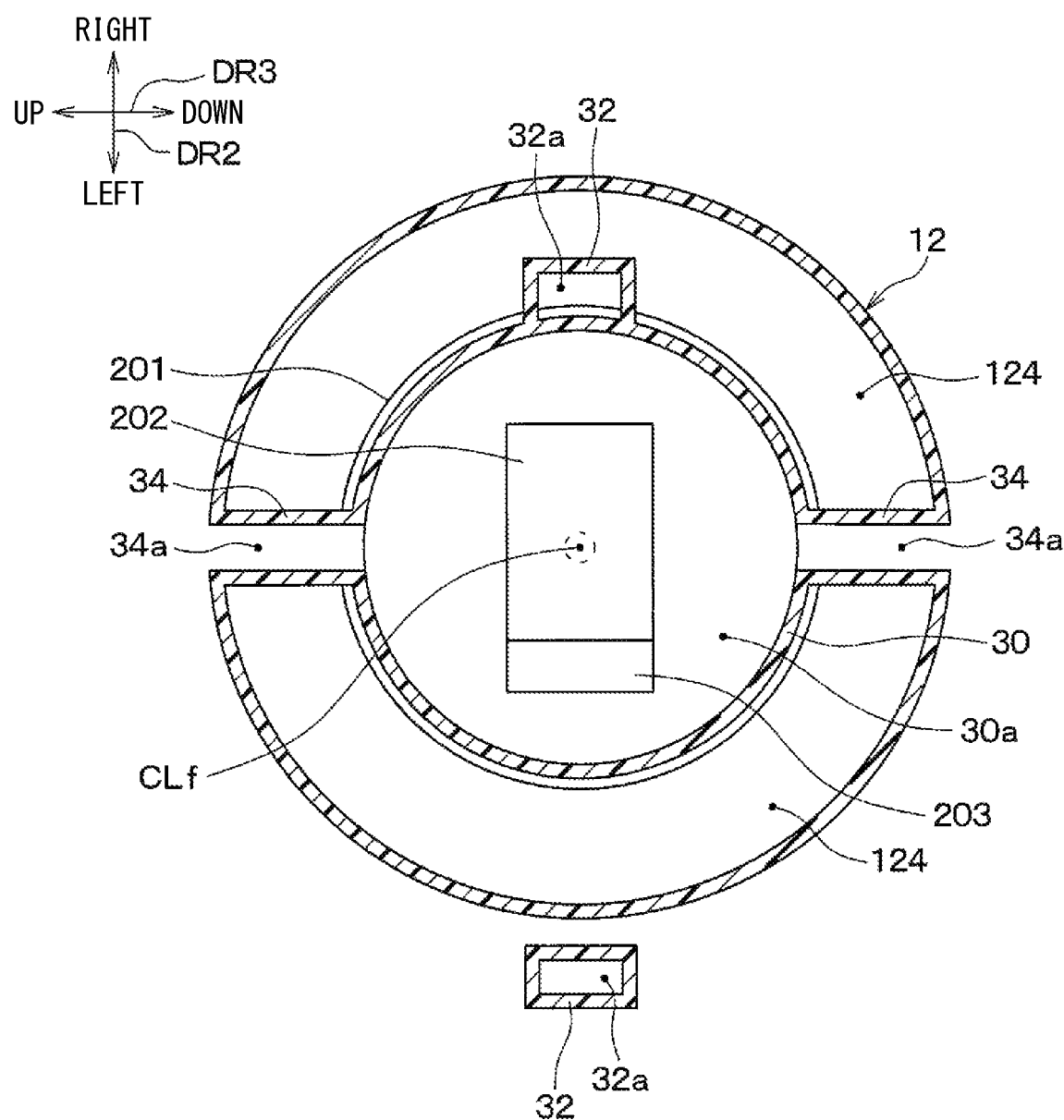
FIG. 12 is a schematic cross-sectional view showing a cross section taken along a line II-II of FIG. 1 in a fifth embodiment, and is a view corresponding to FIG. 2.

As shown in FIG. 12, a motor space 30*a* of the present embodiment is not a closed space and communicates with the vehicle interior in the fifth embodiment. The present embodiment is different from the first embodiment in this point.

Specifically, a vehicle air conditioning unit 10 of the present embodiment includes a vehicle interior communication portion 34 which forms a vehicle interior communication passage 34*a*. One end of the vehicle interior communication passage 34*a* is opened at the vehicle interior, and the other end of the vehicle interior communication passage 34*a* is opened at the motor space 30*a*. That is, the vehicle interior communication passage 34*a* is made for the motor space 30*a* communicates with the vehicle interior.

The vehicle interior communication portion 34 is formed in a tubular shape and is arranged across the in-case passage 124. Therefore, the vehicle interior communication passage 34*a* is separated from the in-case passage 124, and the motor space 30*a* is also separated from the in-case passage 124 in the present embodiment. Thus, the communication between the motor space 30*a* and the in-case passage 124 is restricted by the motor space forming portion 30 and the vehicle interior communicating portion 34, similarly to the first embodiment.

As described above, in the present embodiment, because the motor space 30*a* communicates with the vehicle interior, the overcooling of the blower motor 202 is restricted by the inside air. Therefore, for example, compared with a case that the motor space 30*a* is a closed space, condensation water generated at the blower motor 202 can be effectively reduced.

In the present embodiment, two of the vehicle interior communication portions 34 are provided, however, the number of the vehicle interior communication portions 34 may be one, three or more.

Aside from the above described aspects, the present embodiment is the same as the first embodiment. Further, in the present embodiment, the same effects as the first embodiment described above can be obtained in the same manner as in the first embodiment.

The present embodiment is a modification based on the first embodiment but it can also be combined with any of the second to the fourth embodiments described above.

OTHER EMBODIMENTS (1) According to the embodiments described above, for example, as shown in FIG. 1, the in-case partition wall 22 divides the passage downstream of the blower fan 201 with respect to the air flow in the in-case passage 124 into the first downstream passage 124*a* and the second downstream passage 124*b*. However, this is an example. For example, the in-case partition wall 22 may not be provided, and the passage may not be divided at the downstream of the blower fan 201 with respect to the air flow.

(2) According to the above embodiments, for example, as shown in FIG. 1, the vehicle air conditioning unit 10 includes the filter 14, however, the filter 14 may not be arranged.

(3) According to the second embodiment described above, as shown in FIG. 7, the passage outlet 32*c* of the motor cooling passage 32*a* is located downstream of the air introduction portion 121 and upstream of the filter 14 with respect to the air flow in the in-case passage 124. However, this is an example. For example, the passage outlet 32*c* may be located downstream of the filter 14 and upstream of the evaporator 16 with respect to the air flow in the in-case passage 124.

(4) According to the embodiments described above, for example, as shown in FIG. 1, the partition wall 301 divides into the motor space 30*a* and the motor cooling passage 32*a*, and the motor cooling passage 32*a* does not communicate with the motor space 30*a*. However, this is an example. For example, the vehicle air conditioning unit 10 may be structured such that the air in the motor cooling passage 32*a* is introduced to the motor space 30*a*.

(5) In the drawings described in the above embodiments such as FIG. 1, the direction in which the vehicle faces is shown for convenience, however, a direction in which the vehicle air conditioning unit 10 is installed in the vehicle is not limited.

(6) According to the embodiments described above, for example, as shown in FIG. 1, the blower fan 201 extends such that one side surface of the blower fan 201 on the other side of the fan axis CLf faces the downstream side with respect to the air flow in the in-case passage 124. However, the blower fan 201 is not limited to be arranged in the direction in which the blower fan 201 faces in the above embodiments.

(7) The present disclosure is not limited to the embodiments described above and can be modified in various manners. The above embodiments are not independent of each other, and can be appropriately combined except when the combination is obviously impossible.

In each of the above-mentioned embodiments, it goes without saying that components of the embodiment are not necessarily essential except for a case in which the components are particularly clearly specified as essential components, a case in which the components are clearly considered in principle as essential components, and the like. Further, in each of the embodiments described above, when numerical values such as the number, numerical value, quantity, range, and the like of the constituent elements of the embodiment are referred to, except in the case where the numerical values are expressly indispensable in particular, the case where the numerical values are obviously limited to a specific number in principle, and the like, the present disclosure is not limited to the specific number.

Furthermore, a material, a shape, a positional relationship, or the like, if specified in the above described example embodiments, is not necessarily limited to the specific material, shape, positional relationship, or the like unless it is specifically stated that the material, shape, positional relationship, or the like is necessarily the specific material, shape, positional relationship, or the like, or unless the material, shape, positional relationship, or the like is obviously necessary to be the specific material, shape, positional relationship, or the like in principle.

(Overview)

According to a first aspect described in a part or all of the above embodiments, a motor cooling passage includes a passage inlet and a passage outlet. The passage inlet is opened downstream of an impeller with respect to an air flow in an in-case passage. The passage outlet is opened upstream of the impeller with respect to the air flow in the in-case passage.

Further, according to a second aspect, a motor space forming portion is arranged in an air conditioning case and forms a motor space separated from the in-case passage. A blower motor is arranged in the motor space. A cooling passage portion is configured such that heat is exchanged between the blower motor and the air in the motor cooling passage through the air in the motor space. Therefore, cold air cooled by a cooler does not hit the blower motor directly, and the blower motor can be protected from condensation caused by supercooling.

Further, according to a third aspect, the motor space communicates with the vehicle interior. Therefore, the supercooling of the blower motor is restricted, and effect to restrict the condensation at the blower motor can be improved, compared with a case that the motor space is a closed space.

According to a fourth aspect, the cooling passage portion includes a plate portion formed in a plate shape and configured to promote the heat exchange between the air in the motor space and the air in the motor cooling passage. Therefore, compared to a case without the plate portion, a cooling of the blower motor arranged in the motor space can be promoted.

According to a fifth aspect, the motor cooling passage is partially opened between the passage inlet and the passage outlet to the in-case passage. Therefore, for example, as cutting is facilitated because of the opened shape, the formability of members including the cooling passage portion can be enhanced.

According to a sixth aspect, the passage outlet is opened upstream of the cooler with respect to the air flow in the in-case passage. As a result, the air flowing from the motor cooling passage is enabled to flow to the cooler and be cooled again by the cooler. Therefore, the cooler is enabled to cancel out temperature rising of the air in the motor cooling passage associated with the cooling of the blower motor. In addition, the temperature of the air blown from a vehicle air conditioning unit can be protected from effect of heat generation at the blower motor.

According to a seventh aspect, a heater is arranged downstream of the impeller with respect to the air flow in the air conditioning case and configured to heat the air blown from the impeller. An air-volume ratio adjusting door is arranged downstream of the impeller with respect to the air flow in the air conditioning case and configured to adjust a ratio of air volume of the air passing through the heater to the air volume of air bypassing the heater. In addition, the passage inlet is opened upstream of the heater and the air-volume ratio adjusting door with respect to the air flow in the in-case passage. Therefore, the cold air before being heated by the heater can be introduced into the motor cooling passage through the passage inlet, without being affected by an operating state of the air-volume ratio adjusting door.

What is claimed is:

1. An air conditioning unit for a vehicle, comprising:
    an air conditioning case defining an in-case passage in which air flows to a vehicle interior;
    a cooler arranged in the air conditioning case and configured to cool the air flowing in the in-case passage;
    a blower that includes a blower motor and an impeller configured to be rotated by the blower motor and generate an air flow in the in-case passage, the blower being arranged downstream of the cooler with respect to the air flow in the air conditioning case; and
    a motor cooling passage in which air in the in-case passage flows to cool the blower motor, wherein
    the motor cooling passage includes a passage inlet opened and located downstream of the impeller with respect to the air flow in the in-case passage, and a passage outlet opened and located upstream of the impeller with respect to the air flow in the in-case passage.

2. The air conditioning unit for a vehicle according to claim 1, further comprising:
    a motor space provided in the air conditioning case and separated from the in-case passage, wherein
    the blower motor is arranged in the motor space, and
    the motor cooling passage is arranged to exchange heat between the blower motor in the motor space and air in the motor cooling passage through air in the motor space.

3. The air conditioning unit for a vehicle according to claim 2, wherein
    the motor space communicates with the vehicle interior.

4. The air conditioning unit for a vehicle according to claim 2, wherein
    the motor cooling passage is defined by a plate and configured to exchange the heat between the air in the motor space and the air in the motor cooling passage.

5. The air conditioning unit for a vehicle according to claim 1, wherein the motor cooling passage is partially opened to the in-case passage between the passage inlet and the passage outlet.

6. The air conditioning unit for a vehicle according to claim 1, wherein
the passage outlet is opened and located upstream of the cooler with respect to the air flow in the in-case passage.

7. The air conditioning unit for a vehicle according to claim 1, further comprising:
a heater arranged downstream of the impeller with respect to the air flow in the air conditioning case and configured to heat air blown from the impeller; and
an air-volume ratio adjusting door arranged downstream of the impeller with respect to the air flow in the air conditioning case and configured to adjust a ratio of air volume of air passing through the heater to air volume of air bypassing the heater, wherein
the passage inlet is opened and located upstream of the heater and the air-volume ratio adjusting door, with respect to the air flow in the in-case passage.

8. An air conditioning unit for a vehicle, comprising:
an air conditioning case defining an in-case passage in which air flows to a vehicle interior;
a cooler arranged in the air conditioning case and configured to cool the air flowing in the in-case passage;
a blower that includes a blower motor and an impeller configured to be rotated by the blower motor and generate an air flow in the in-case passage, the blower being arranged downstream of the cooler with respect to the air flow in the air conditioning case;
a motor space casing arranged in the air conditioning case and defining a motor space separately from the in-case passage, the blower motor being arranged in the motor space; and
a cooling passage wall provided in the in-case passage to define a motor cooling passage through which air in the in-case passage flows to exchange heat with air in the motor space, wherein
the motor cooling passage encloses a part of the motor space casing, and
the motor cooling passage includes a passage inlet opened and located downstream of the impeller with respect to the air flow in the in-case passage, and a passage outlet opened and located upstream of the impeller with respect to the air flow in the in-case passage.

* * * * *